A. W. BLUNDEN.
KETTLE STILL.
APPLICATION FILED DEC. 27, 1906.
911,467.
Patented Feb. 2, 1909.
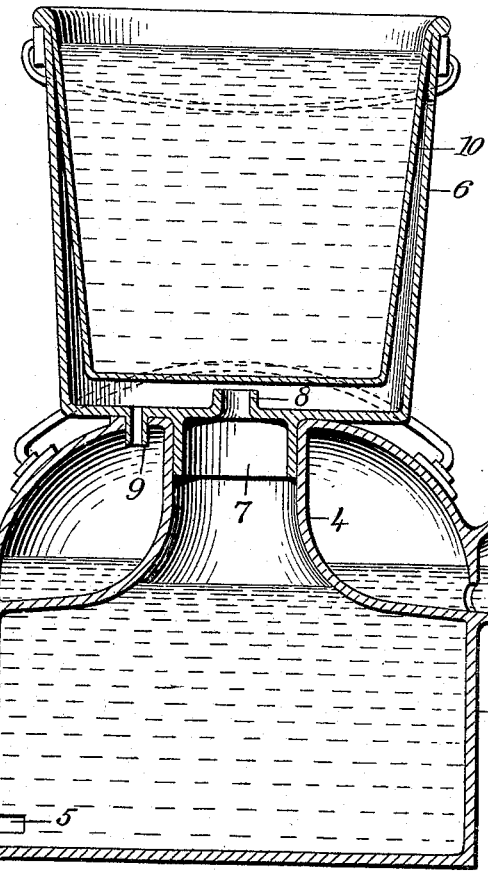
WITNESSES
H. Walker
INVENTOR
Arthur W. Blunden
BY Munn & Co
ATTORNEYS

UNITED STATES PATENT OFFICE.

ARTHUR WILLIAM BLUNDEN, OF SEBASTOPOL, CALIFORNIA.

KETTLE-STILL.

No. 911,467.  Specification of Letters Patent.  Patented Feb. 2, 1909.

Application filed December 27, 1906. Serial No. 349,648.

*To all whom it may concern:*

Be it known that I, ARTHUR W. BLUNDEN, a subject of the King of Great Britain, and a resident of Sebastopol, in the county of Sonoma and State of California, have invented a new and Improved Kettle-Still, of which the following is a full, clear, and exact description.

This invention is an improvement in kettle stills, relating to devices which may be used as either an ordinary kettle, or as a kettle in connection with a still.

The object of the invention is to provide a simple device of this character which can be manufactured at a comparatively small cost and especially adapted for distilling water to furnish wholesome drinking water without impairing its use in the capacity of a kettle. This will be found not only advantageous in household use but will appeal to campers and those required to drink water from muddy or polluted streams.

The invention consists of a vessel of the usual kettle shape, having an upper and lower compartment each provided with a spout for emptying the contents. The upper and lower compartments are connected to each other when desired to use as a still, through the intermediary of a cooling or condensing chamber, which acts to condense the steam formed by the water in the lower compartment and conducts it to the upper. By this construction, in a single vessel is obtainable either distilled or undistilled water, as desired.

Reference is to be had to the accompanying drawing forming a part of this specification, wherein the figure shown is a vertical, central, sectional view of one embodiment of my improvement.

The numeral 1 indicates a kettle comprising spouts 2 and 3 and a partition 4 in its interior, dividing it into two compartments as shown. The spout 2 leading from the lower compartment is of usual formation and connects with this compartment by a long, narrow opening 5 near the base of the kettle, which prevents the steam from escaping from the surface of the water through the spout when the water in the kettle is low. The spout 3 is preferably made smaller than the spout 2 and connects with the upper compartment, as shown in the drawing figure.

The partition 4 is shaped much after the fashion of the neck of a jug leading through the center of the upper compartment to the top of the kettle with which it is joined. In the neck of this opening formed by the partition may be inserted a cover, when using the device as a kettle alone; or when used as a combined kettle and still, the cooling chamber is substituted as shown. This consists of a bucket 6 having a short pipe 7 at the center of its bottom to fit the neck of the compartment to hold and exactly center the bucket on the top of the kettle.

Leading from the center of the pipe 7 is a flanged opening 8 projecting upwardly into the center of the bucket bottom. The bottom of the bucket also communicates with the top compartment by means of a small pipe 9 at one side of the pipe 7 extending downwardly and entering an opening for the purpose in the kettle top.

Adapted to be inserted in the bucket 6 at its upper end, or made as an integral part thereof, as shown, is a bucket 10, having sides of slightly greater inclination than those of the bucket 6, and reaching to within a short distance of the top of the flanged opening 8. This construction provides a chamber between the two buckets about which the steam from the kettle can freely circulate in the condensing action. The kettle and buckets are, of course, furnished with convenient handles by which they may be moved about to empty or refill them.

In the operation of the still, the lower compartment of the kettle is filled with water to about the point indicated in the drawing, and the bucket 6 seated on its top, as shown, with the bucket 10 filled with cold water. By now applying fire to the kettle sufficient to boil the water in the lower compartment, the steam rises through the pipe 7 and opening 8 and circulates about the compartment between the two buckets. The cold water in the bucket 10 soon condenses this steam, which falls as water to the bottom of the bucket 6. It cannot now escape back to the lower compartment of the kettle due to the flanges of the opening 8, but passes through the pipe 9 to the upper compartment as clear and wholesome distilled water.

It is evident that various minor changes may be made in the details of construction hereinbefore described; and I consider that I am entitled to such modifications as fall within the scope of the invention as claimed.

Having thus described my invention I claim as new and desire to secure by Letters Patent:

1. The combination of a kettle, a partition having a jug-like neck connecting with the top of the kettle and dividing it into two compartments, a spout leading from each compartment, a bucket seated on top of the kettle having a downwardly projecting pipe at its center to fit the neck of the compartment, a flanged opening projecting upwardly from the bottom of the bucket at the center of the pipe, a pipe connected to the bottom of the bucket and passing into the upper compartment of the kettle, and a second bucket seated in the first-named bucket to form a condensing chamber, for the purpose described.

2. The combination of a kettle, a partition having a jug-like neck connected to the top of the kettle and dividing it into two compartments, a spout connecting with each compartment, a bucket seated on the top of the kettle, a pipe projecting from the bottom of the bucket fitting in the neck of the partition, an opening in the bottom of the bucket leading from the pipe, means connecting the bucket with the other compartment, and a second bucket carried by the first bucket forming a condensing chamber between them, for the purpose described.

3. The combination of a kettle divided into an upper and lower compartment, a spout leading from each compartment of the kettle, and a vessel provided with a condensing chamber seated on the kettle, with the condensing chamber connecting with each compartment, whereby as steam passes from the lower compartment into said chamber it will condense and pass into the upper compartment.

In testimony whereof I have signed my name to this specification in the presence of two subscribing witnesses.

ARTHUR WILLIAM BLUNDEN.

Witnesses:
   A. H. LATON,
   A. B. SWAIN.